United States Patent [19]

Hunt, Jr. et al.

[11] E Re. 28,830

[45] Reissued May 25, 1976

[54] METHOD FOR REDUCING SULFUR COMPOUNDS IN SULFUR PLANT EFFLUENT

[75] Inventors: Elton B. Hunt, Jr.; Karol L. Hujsak, both of Tulsa, Okla.

[73] Assignee: Amoco Production Company, Tulsa, Okla.

[22] Filed: Nov. 4, 1974

[21] Appl. No.: 520,323

Related U.S. Patent Documents

Reissue of:

[64] Patent No.: 3,702,884
Issued: Nov. 14, 1972
Appl. No.: 39,844
Filed: May 22, 1970

[52] U.S. Cl. ..... 423/574 R
[51] Int. Cl.[2] ..... C01B 17/04
[58] Field of Search ..... 423/573, 574, 576, 242

[56] References Cited

UNITED STATES PATENTS

| | | | |
|---|---|---|---|
| 2,767,482 | 10/1956 | Duecker | 423/576 |
| 3,454,354 | 7/1969 | Kerr | 423/242 |
| 3,476,513 | 11/1969 | Welty et al. | 423/242 |

FOREIGN PATENTS OR APPLICATIONS

| | | |
|---|---|---|
| 223,904 | 5/1957 | Australia |
| 783,433 | 4/1968 | Canada |
| 717,483 | 10/1954 | United Kingdom |
| 722,038 | 1/1955 | United Kingdom |

*Primary Examiner*—G. O. Peters
*Attorney, Agent, or Firm*—Arthur McIlroy

[57] ABSTRACT

In the recovery of sulfur from hydrogen sulfide-containing gases wherein the first of a series of reactors is operated under conventional Claus conditions, one or more of the remaining catalytic reactors in the sulfur plant are operated at temperatures of the order of from about 250° to about 400°F. whereby free sulfur is deposited on the catalyst, regeneration of such catalyst is effected by heating a portion of the first reactor-condenser effluent to 500°–700°F. and flowing the resultant hot gas through the deactivated catalyst bed to vaporize free sulfur therefrom and regenerate the catalyst. Before placing the freshly regenerated catalyst bed back on stream, it is cooled with unheated first reactor-condenser effluent to a temperature of from about 250° to about 400° F. Thereafter the above cycle is repeated.

4 Claims, 1 Drawing Figure

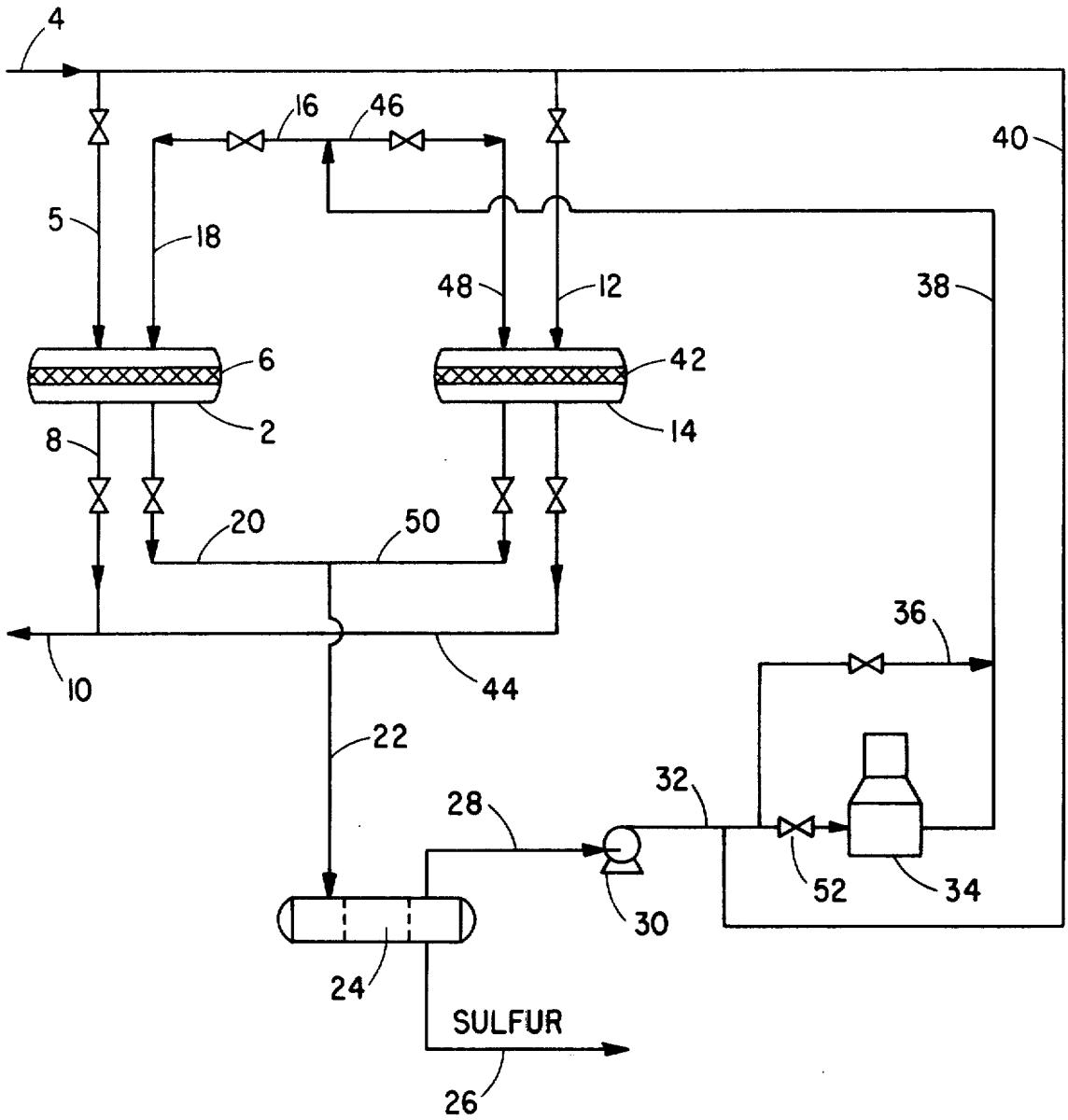
INVENTORS
ELTON B. HUNT, JR.
BY KAROL L. HUJSAK
Arthur McDougall
ATTORNEY

METHOD FOR REDUCING SULFUR COMPOUNDS IN SULFUR PLANT EFFLUENT

Matter enclosed in heavy brackets [ ] appears in the original patent but forms no part of this reissue specification; matter printed in italics indicates the additions made by reissue.

INTRODUCTION

The present invention relates to the recovery of free sulfur from gases containing hydrogen sulfide. More particularly, it is concerned with the cleanup of the effluent from a plant producing free sulfur from hydrogen sulfide and prior to the discharge of such effluent into the atmosphere.

BACKGROUND OF THE INVENTION

Air pollution is a problem that must be solved in the near future; sulfur recovery plants reduce air pollution by converting hydrogen sulfide to a useful product. However, these plants discharge from 5–10% of the hydrogen sulfide in the acid gas feed to the atmosphere after incineration to convert the sulfur compounds in the plant tail gas to sulfur dioxide. For example, in the case of a 1500 t./d. sulfur plant this can amount to 150 tons per day of sulfur dioxide being exhausted into the atmosphere. Current sulfur recovery technology is unable to significantly reduce these figures.

BRIEF DESCRIPTION OF THE INVENTION

We have found, however, that by the process of our invention the sulfur compounds discharged to the atmosphere which normally are equivalent to about 5–10 mol percent of the hydrogen sulfide in the acid gas, can be decreased to a value of no more than about 1 mol percent, permitting 99% or higher sulfur recovery. This advance in the art of sulfur recovery is accomplished by the use of at least three reactors. The vapor effluent from the sulfur condenser following the first of these reactors is fed alternately to the two remaining reactors at a temperature generally below 400° F., for example, within a temperature range of from about 250–350° F., preferably from about 250°–300° F. At such temperature the reaction of hydrogen sulfide with sulfur dioxide tends to go substantially to completion in the presence of a suitable catalyst. As a result, the produced sulfur is deposited on the catalyst, giving tail gas containing not more than about .02 to 0.2 mol percent hydrogen sulfide and sulfur dioxide. When the second reactor effluent exceeds a predetermined hydrogen sulfide and sulfur dioxide content, the third reactor becomes the cleanup reactor, operating on first reactor-condenser vapor effluent, and the second reactor is regenerated. Similarly, in the case of a four-reactor plant, the cleanup and catalytic regeneration cycles alternate between the third and fourth reactors. This process can be continued indefinitely.

The practice in the past has been to maintain catalyst beds in Claus type sulfur recovery plants at a temperature of not less than about 400°–450° F. because the catalyst became deactivated at lower temperatures. It has been recognized that a higher conversion to sulfur would be obtained by using lower temperatures if suitable catalyst activity could be maintained at these temperatures. We have discovered a method which enables us to operate at temperatures below about 400° F. and still maintain satisfactory activity. In our process the sulfur which deposits on the catalyst at low temperature and tends to reduce its activity is periodically desorbed to maintain satisfactory catalyst activity. The average catalyst activity is thereby maintained at a much higher level than had been expected at the operating temperature. We have further observed that the catalyst can retain as much as about half its weight of sulfur before it loses significant activity. Our invention and contribution to the operation of sulfur recovery plants capable of discharging exceptionally low content sulfur condenser streams to the atmosphere is based on the novel manner in which the sulfur-ladened catalyst referred to above—which has lost a substantial amount of activity—can be regenerated. By the process of our invention we accomplish this improvement through the recycling of a separate hot (450° to 700° F.) gas stream, formed in the plant itself.

The process of our invention will be more clearly understood by reference to the accompanying flow diagram wherein the last two reactors of a three-reactor sulfur recovery unit are diagrammatically shown. Upstream of reactor 2 are, in succession, a furnace, a condenser, the first reactor and the condenser handling the product effluent from the first reactor, none of which are illustrated. The vapor effluent from the first reactor-condenser is taken through line 4 and introduced into reactor 2 via line 5 at an inlet temperature of 250°–300° F. Here, substantially all of the hydrogen sulfide and sulfur dioxide present in said effluent is removed therefrom in the form of free sulfur which is deposited on the catalyst in bed 6, yielding an effluent in line 8 containing not more than about .2 mol percent of hydrogen sulfide and sulfur dioxide. This stream is then discharged to the atmosphere via line 10. The cleanup of the gas in line 4 in this manner is continued until the hydrogen sulfide and sulfur dioxide content in the effluent in line 8 exceeds a predetermined level, indicating the catalyst is becoming deactivated owing to excessive amounts of sulfur deposited thereon. At this point the valves in lines 5 and 8 are closed and the ones in lines 12 and 44 opened so that reactor 14 now becomes the cleanup reactor. Regeneration of reactor 2 is effected by introduction of hot (500°–600° F.) gas—prepared as described below—into bed 6 via valved line 16 and line 18.

Under these temperature conditions free sulfur is vaporized off the catalysts and is removed from reactor 2 by means of valved line 20 and line 22, the latter entering condenser 24. The sulfur removal step is continued until the activity of the catalyst has been restored, i.e., until there is a substantial absence of sulfur in line 20. Product sulfur is withdrawn through line 26 while gas at about 250°–300° F. is taken off by means of line 28, introduced into blower 30 and discharged therefrom through line 32, valve 52, heater 34 and line 38. Heater 34 may be a direct fired heater, an indirect heat exchanger or an in-line heater. In the latter case we prefer to use acid gas as a fuel, burning it with sufficient air to yield a product gas having hydrogen sulfide and sulfur dioxide in a molar ratio of about 2:1. The excess gas introduced into the recycle system in this manner leaves the system through line 40 and passes through the cleanup reactor 14 before being discharged through lines 44 and 10. Cooling of catalyst bed 6 after regeneration is effected by passing the gas in line 32 around heater 34 via valved line 36 and into line 38. From there the cool gas flows through valved line 16 and line 18 into hot catalyst 6. Effluent from reactor 2 during the cooling step is taken through valved line 20, line 22, and introduced into condenser 24 which removes the heat extracted from catalyst bed 6. Cool gas is taken off through line 28 and recycled as before until catalyst bed 6 decreases in temperature to 250°–300° F. With this decreased temperature the gas volume in the system will shrink to some extent. The resulting volume decrease in the recycling system is made up by flow through the pressure equalizing line 40 which supplies gas from line 4. In a similar manner, there is a volume increase during regeneration resulting in flow out of the recycle system through the pressure equalizing line 40 and through valved line 5 if reactor 2 is on cleanup or valved line 12 if reactor 14 is on cleanup.

In connection with the so-called cleanup, regeneration, and cooling cycles of our invention, it should be pointed out that the cleanup period is usually of the order of 4–12 hours, while the regeneration and cooling cycles each generally require from about 2–6 hours. Thus, for example, while reactor 14 is on cleanup, reactor 2 can be regenerated and cooled so that it is available for cleanup duty when reactor becomes deactivated.

Continuing now with the description of the flow diagram, when reactor 2 is switched from the cleanup to the regeneration cycle, valved line 5 is closed and valved line 12 opened, causing first reactor condenser vapor effluent in line 4 to be fed into reactor 14 via line 12 at an inlet temperature of about 250°–300° F. Free sulfur is deposited on catalyst bed 42 and the effluent therefrom, containing less than 0.2 mol percent hydrogen sulfide and sulfur dioxide, is discharged from the system via lines 44 and 10. This operation is continued until catalyst bed 42 becomes substantially deactivated as indicated by the increase of hydrogen sulfide and sulfur dioxide in line 44. To regenerate catalyst bed 42 the gas in discharge line 32 is elevated in temperature in heater 34 to from about 500°–600° F. and the resulting hot gas transferred to reactor 14 via lines 38, 46 and 43. Under these conditions free sulfur is vaporized off catalyst bed 42, removed from reactor 14 through valved line 50, line 22, and introduced into condenser 24 where liquid sulfur is withdrawn from the system through line 26. Uncondensed gases are taken off through line 23, reheated in heater 34 and returned to catalyst bed 42 as previously described until the catalyst has been reactivated. Thereafter the gas in line 32 is diverted around heater 34 through line 36. This gas then flows through lines 38, 46 and 48 into catalyst bed 42 where the latter is ultimately brought down to a temperature of about 250°–300° F. In the meantime the effluent from reactor 14 during this cooling cycle is taken through lines 50 and 22 into condenser 24 where the heat extracted from catalyst bed 42 is removed.

From the foregoing description it will be apparent that we have provided a process for the recovery of sulfur from hydrogen sulfide and sulfur dioxide whereby a minimum of unreacted sulfur compounds is discharged to the atmosphere via the plant effluent. The process of our invention further provides a novel means of catalyst regeneration and plant effluent cleanup, the regeneration step being effected with a gas stream that can be recycled indefinitely within the system.

We claim:

[ 1. In a process for removing hydrogen sulfide and sulfur dioxide in the condenser effluent from a Claus catalytic reaction zone wherein said effluent is contacted with a catalyst in a second reaction zone, said catalyst being capable of promoting the reaction between hydrogen sulfide and sulfur dioxide at a temperature at which the sulfur formed is deposited on said catalyst and in subsequent steps the catalyst is regenerated by the use of hot gas at a temperature of about 450°–700° F. to remove the deposited sulfur, the improvement comprising:

(1) condensing said sulfur from the sulfur-containing regenerating gas by cooling said gas, (2) recycling said cooled gas to cool the thus regenerated catalyst, (3) reheating said cooled gas for use in regenerating additional catalyst, (4) repeating steps 1 to 3 while equalizing the pressure between said regenerating and cooled gas and the hydrogen sulfide-sulfur dioxide feed to said second reaction zone by transfer of gas between said regenerating or cooled gas and said feed. ]

[ 2. The process of claim 1 in which the cooled gas in step 2 is a temperature of from about 250° to about 350° F. ]

[ 3. The process of claim 1 wherein a plant is employed having three catalytic reaction zones and wherein the second and third reactors thereof are alternately operated as cleanup reactors for the first reactor-condenser vapor effluent, the catalyst in said second and third reactors likewise being alternately regenerated and cooled and the above cycle repeated. ]

*4. In a process for removing hydrogen sulfide and sulfur dioxide in the condenser effluent from a Claus catalytic reaction zone, the improvement comprising:*

*(1) introducing said effluent into a second catalytic reaction zone at an inlet temperature of about 250° to 400°F whereby sulfur is deposited on the surface of the catalyst in said second zone and continuing the deposition of sulfur on the catalyst in said second zone until the amount of hydrogen sulfide and sulfur dioxide in the effluent from said second zone reaches a preset allowable limit,*

*(2) effecting removal of said deposit from the catalyst in said second zone by contacting the catalyst therein at a temperature from about 450° to 700°F with gas stream (1) produced in Step (4),*

*(3) withdrawing from said second zone a mixture (1) of sulfur vapors and gas stream (1),*

*(4) cooling mixture (1) to produce liquid sulfur and cooled gas stream (1),*

*(5) recycling gas stream (1) cooled in Step (4) to cool the catalyst in said second zone, and repeating Steps (1) to (5) while equalizing the system pressure in Steps (1) through (5) by transfer of gas between cooled gas stream (1) and said effluent.*

*5. In a process for removing hydrogen sulfide and sulfur dioxide in the condenser effluent from a Claus catalytic reaction zone, the improvement comprising:*

*(1) introducing said condenser effluent into one of two catalytic reaction zones at an inlet temperature of 250° to 400°F whereby free sulfur is deposited on the surface of the catalyst therein, and continuing the deposition of sulfur on the catalyst until the amount of hydrogen sulfide and sulfur dioxide in the effluent from said one of said zones reaches a preset allowable limit,*

(2) *thereafter switching the flow of said condenser effluent to the other of said catalytic reaction zones under the conditions of Step (1),*

(3) *effecting removal of said deposit from the catalyst in said one of said zones by contacting the catalyst therein at a temperature of from about 450° to 700°F with gas stream (1) produced in Step (4),*

(4) *cooling the effluent from said one of said zones to obtain liquid sulfur and gas stream (1),*

(5) *cooling the hot, freshly regenerated catalyst in said one of said zones by flowing gas stream (1) therethrough,*

(6) *and thereafter subjecting the catalyst in said other of said zones to the conditions of Steps (3) through (5) in sequence while equalizing the system pressure in Steps (1) through (6) by transfer of gas between cooled gas stream (1) and said effluent.*

*6. Process of claim 5 in which the hot, freshly regenerated catalyst is cooled with gas stream (1) at a temperature of from about 250° to about 350°F.*

*7. The process of claim 5 in which the hot, freshly regenerated catalyst is cooled with gas stream (1) at a temperature of from about 250° to about 300°F.*

* * * * *